(12) United States Patent
Ju

(10) Patent No.: US 7,555,201 B2
(45) Date of Patent: Jun. 30, 2009

(54) OPTICAL DISC PLAYER SYSTEM AND METHOD OF CONTROLLING A DECODING UNIT IN THE OPTICAL DISC PLAYER SYSTEM TO READ ENCODED BITSTREAM DATA FROM A BUFFER MEMORY

(75) Inventor: Shang-Tzu Ju, Hsin-Chu (TW)

(73) Assignee: MediaTek Inc., Hsin-Chu Hsien (TW)

( * ) Notice: Subject to any disclaimer, the term of this patent is extended or adjusted under 35 U.S.C. 154(b) by 0 days.

(21) Appl. No.: 11/279,253

(22) Filed: Apr. 11, 2006

(65) Prior Publication Data
US 2006/0165390 A1   Jul. 27, 2006

Related U.S. Application Data

(63) Continuation-in-part of application No. 10/376,443, filed on Feb. 28, 2003, now abandoned.

(30) Foreign Application Priority Data
Mar. 1, 2002   (TW) ............................... 91103814 A

(51) Int. Cl.
*H04N 5/91* (2006.01)
*H04N 7/00* (2006.01)
*H04N 5/00* (2006.01)
*H04N 17/00* (2006.01)
*H04N 17/02* (2006.01)
*H04N 5/44* (2006.01)

(52) U.S. Cl. .......................... 386/95; 386/46; 386/125; 386/126; 348/177; 348/553

(58) Field of Classification Search ......... 386/125–126, 386/95, 46; 348/177, 553, 569, 656, 706, 348/725, 724
See application file for complete search history.

(56) References Cited

U.S. PATENT DOCUMENTS

| | | | |
|---|---|---|---|
| 6,275,618 B1 * | 8/2001 | Kodama ..................... | 382/238 |
| 6,314,518 B1 * | 11/2001 | Linnartz ..................... | 713/176 |
| 6,463,209 B2 * | 10/2002 | Schultz et al. ............... | 386/125 |
| 6,466,736 B1 | 10/2002 | Chen et al. | |
| 6,647,202 B1 * | 11/2003 | Yamaguchi et al. ........... | 386/68 |
| 2003/0077075 A1 | 4/2003 | Choi | |

* cited by examiner

*Primary Examiner*—Thai Tran
*Assistant Examiner*—Daquan Zhao
(74) *Attorney, Agent, or Firm*—Winston Hsu

(57) ABSTRACT

In a method of controlling multiple decoders in an optical disc player system to read encoded bitstream data divided into multiple sectors from a buffer memory, one of the sectors stored in the buffer memory is read according to a reading pointer associated with one of the decoders that sent out a bitstream request. When a header portion of the sector that is being read from the buffer memory indicates a bitstream type corresponding to that of the bitstream request, a data portion of the sector is transferred to the decoder that sent out the bitstream request, and the reading pointer is adjusted to point to a next one of the sectors stored in the buffer memory. An optical disc player system for implementing the method and an optical disc player system capable of saving the memory bandwidth between a bitstream demultiplexer and a memory are also disclosed.

22 Claims, 7 Drawing Sheets

OPTICAL DISC PLAYER SYSTEM AND METHOD OF CONTROLLING A DECODING UNIT IN THE OPTICAL DISC PLAYER SYSTEM TO READ ENCODED BITSTREAM DATA FROM A BUFFER MEMORY

CROSS REFERENCE TO RELATED APPLICATIONS

The application is a continuation-in-part and claims the benefit of the copending U.S. application Ser. No. 10/376,443, which was filed on Feb. 28, 2003 and entitled "OPTICAL DISC PLAYER SYSTEM AND METHOD OF CONTROLLING A DECODING UNIT IN THE OPTICAL DISC PLAYER SYSTEM TO READ ENCODED BITSTREAM DATA FROM A BUFFER MEMORY".

BACKGROUND OF INVENTION

1. Field of the Invention

The invention relates to optical disc player systems and a method for controlling a decoding unit to read data from a memory device, more particularly to an optical disc player system and a method of controlling a decoding unit in the optical disc player system to read encoded bitstream data from a buffer memory, and an optical disc player system capable of saving the memory bandwidth between a bitstream demultiplexer and a memory.

2. Description of the Prior Art

FIG. 1 illustrates a conventional DVD player system 1 that includes a channel decoder 11 for reading and error-correcting the encoded bitstream data from a disc, a track buffer 13 connected to the channel decoder 11 via a memory interface 15 for storing error-corrected bitstream data from the channel decoder 11, a source decoder 12 connected to the channel decoder 11 for decoding the bitstream data from the channel decoder 11, and a source buffer 14 connected to the source decoder 12 via a memory interface 16 for storing decoded video and audio data from the source decoder 12. In an actual design, the channel decoder 11 and the source decoder 12 are implemented using two separate chips, thereby resulting in a relatively high cost. In order to reduce costs, there is provided a combined chip integrated with the aforesaid functions of the channel and source decoders.

FIG. 2 illustrates another DVD player system 2 that includes a decoding unit 21 having a channel decoder 11' and a source decoder 12'. The integrated decoding unit 21 performs functions the same as those in the system of FIG. 1, and a combined buffer memory 22 connected to the decoding unit 21 via a memory interface 23. Referring to FIG. 3, the buffer memory 22 includes a track buffer 221 for storing data from a disc, and a bitstream buffer 222 for storing demultiplexed bitstream data processed by a bitstream demultiplexer 24 and decoded video and audio data for playback. The decoding unit 12' includes an audio decoder 121, a video decoder 122, a sub-picture decoder 123 and a navigation decoder 124. During a decoding procedure, the bitstream demultiplexer 24 reads encoded bitstream data from the track buffer 221 of the buffer memory 221 via the memory interface 23. After error-correcting and demultiplexing of the encoded bitstream data, the demultiplexed bitstream data is transferred to the bitstream buffer 222 of the buffer memory 22 via the memory interface 23. The decoders 121, 122, 123, 124 read the demultiplexed bitstream data stored in the bitstream buffer 222 of the buffer memory 22 for decoding via the memory interface 23. As such, the buffer memory 22 in the conventional system 2 of FIG. 2 must provide a large bandwidth for channel decoding and source decoding, thereby resulting in relatively high costs and power consumption.

SUMMARY OF THE INVENTION

Therefore, an object of the present invention is to provide an optical disc player system and a method of controlling a decoding unit in the optical disc player system to read encoded bitstream data from a buffer memory that can reduce the memory bandwidth requirement so as to result in relatively low costs and power consumption. Another object of the present invention is to provide an optical disc player system capable of saving the memory bandwidth between a bitstream demultiplexer and a memory.

According to one aspect of the present invention, there is provided a method of controlling a decoding unit in an optical disc player system to read encoded bitstream data from a buffer memory. The encoded bitstream data is divided into a plurality of sectors, each of which includes a data portion, and a header portion for indicating a bitstream type of the data portion. The decoding unit includes a set of different decoders, each of which is used to decode data with a specific bitstream type. The method includes the steps of:

(a) determining whether one of the decoders sent out a bitstream request;

(b) reading one of the sectors stored in the buffer memory according to a reading pointer that is associated with said one of the decoders that sent out the bitstream request;

(c) determining whether a portion of said one of the sectors being read from the buffer memory is the header portion;

(d) determining whether the header portion of said one of the sectors that is being read from the buffer memory indicates a bitstream type corresponding to that of the bitstream request upon determining that the portion of said one of the sectors is the header portion; and (e) transferring the data portion of said one of the sectors that is being read from the buffer memory to said one of the decoders that sent out the bitstream request upon determining that the bitstream type indicated by the header portion of said one of the sectors corresponds to that of the bitstream request, and adjusting the reading pointer to point to a next one of the sectors stored in the buffer memory after reading of said one of the sectors has been completed.

According to another aspect of the present invention, an optical disc player system includes:

a buffer memory for storing encoded bitstream data, the encoded bitstream data being divided into a plurality of sectors, each of which includes a data portion, and a header portion for indicating a bitstream type of the data portion;

a header scanning controller connected to the buffer memory;

a decoding unit connected to the header scanning controller, the decoding unit including a set of different decoders, each of which is used to decode data with a specific bitstream type, each of the decoders being capable of sending a bitstream request for reading encoded bitstream data stored in the buffer memory to the header scanning controller; and a reading pointer recorder connected to the header scanning controller and storing a plurality of reading pointers associated with the decoders;

the header scanning controller reading one of the sectors stored in the buffer memory according to the reading pointer from the reading pointer recorder that is associated with one of the decoders that sent out the bitstream request when the header scanning controller receives the bitstream request from said one of the decoders;

the header scanning controller transferring the data portion of said one of the sectors that is being read from the buffer memory to said one of the decoders that sent out the bitstream request when the header portion of said one of the sectors that is being read from the buffer memory indicates a bitstream type corresponding to that of the bitstream request, and enabling the reading pointer recorder to adjust the reading pointer to point to a next one of the sectors stored in the buffer memory after reading of said one of the sectors has been completed.

According to another aspect of the present invention, an optical disc player system includes:

a buffer memory for storing encoded bitstream data, the encoded bitstream data being divided into a plurality of sectors, each of which includes a data portion, and a header portion for indicating a bitstream type of the data portion;

a header scanning controller coupled to the buffer memory for scanning the header portion and accessing the encoded bitstream data;

a bitstream demultiplexer coupled to the header scanning controller for rearranging the encoded bitstream data according to the bitstream type for continuously storing sectors corresponding to the same bitstream type in the same region within the buffer memory; and a decoding unit connected to the buffer memory, the decoding unit including a set of different decoders, each of the decoders being used to decode data with a specific bitstream type and being capable of reading encoded bitstream data stored in the buffer memory by direct memory access.

BRIEF DESCRIPTION OF DRAWINGS

Other features and advantages of the present invention will become apparent in the following detailed description of the preferred embodiment and the variations thereof with reference to the accompanying drawings, of which.

DETAILED DESCRIPTION

Figure 1:
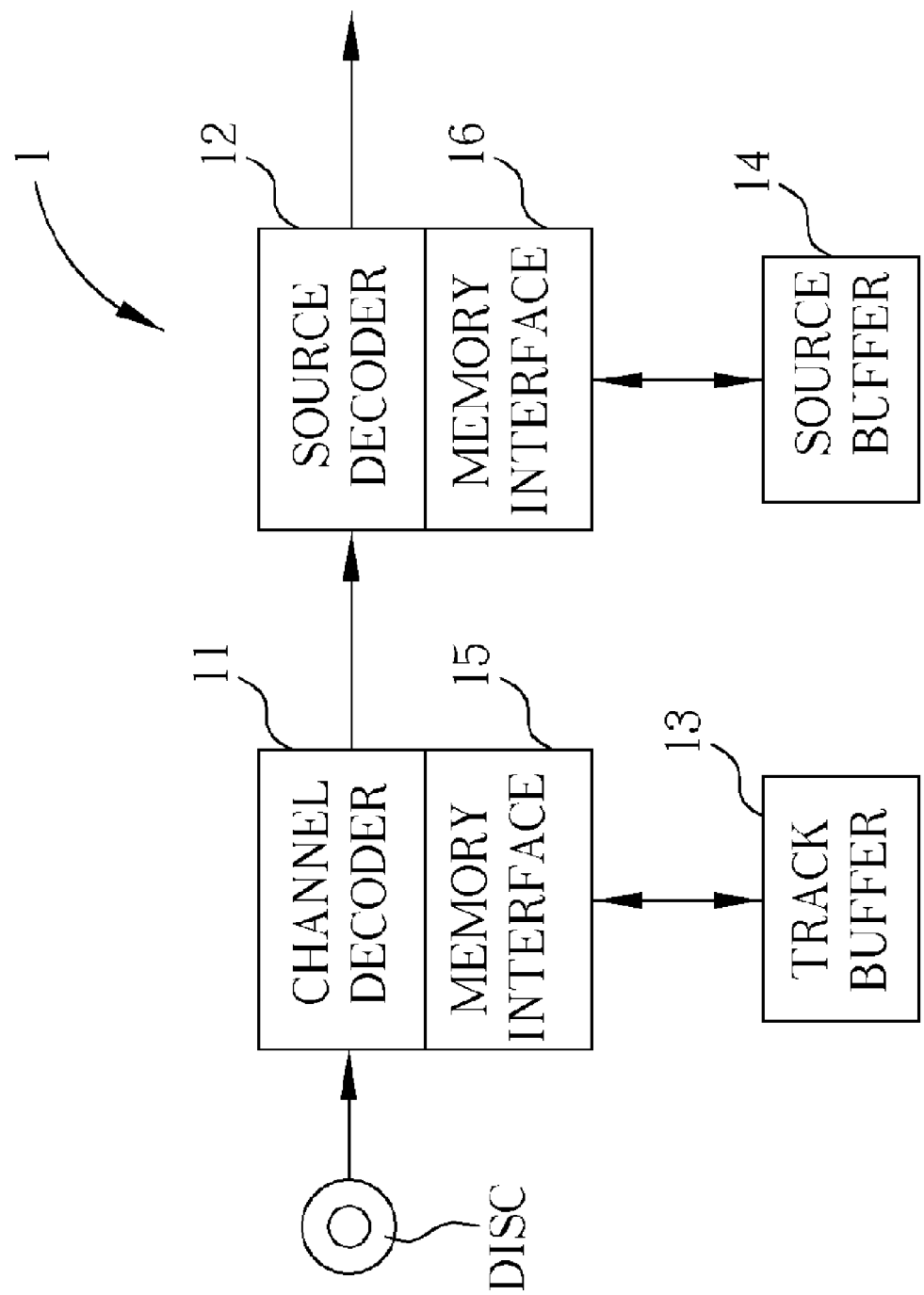
FIG. 1 is a schematic circuit block diagram of a conventional DVD player system.
Figure 2:
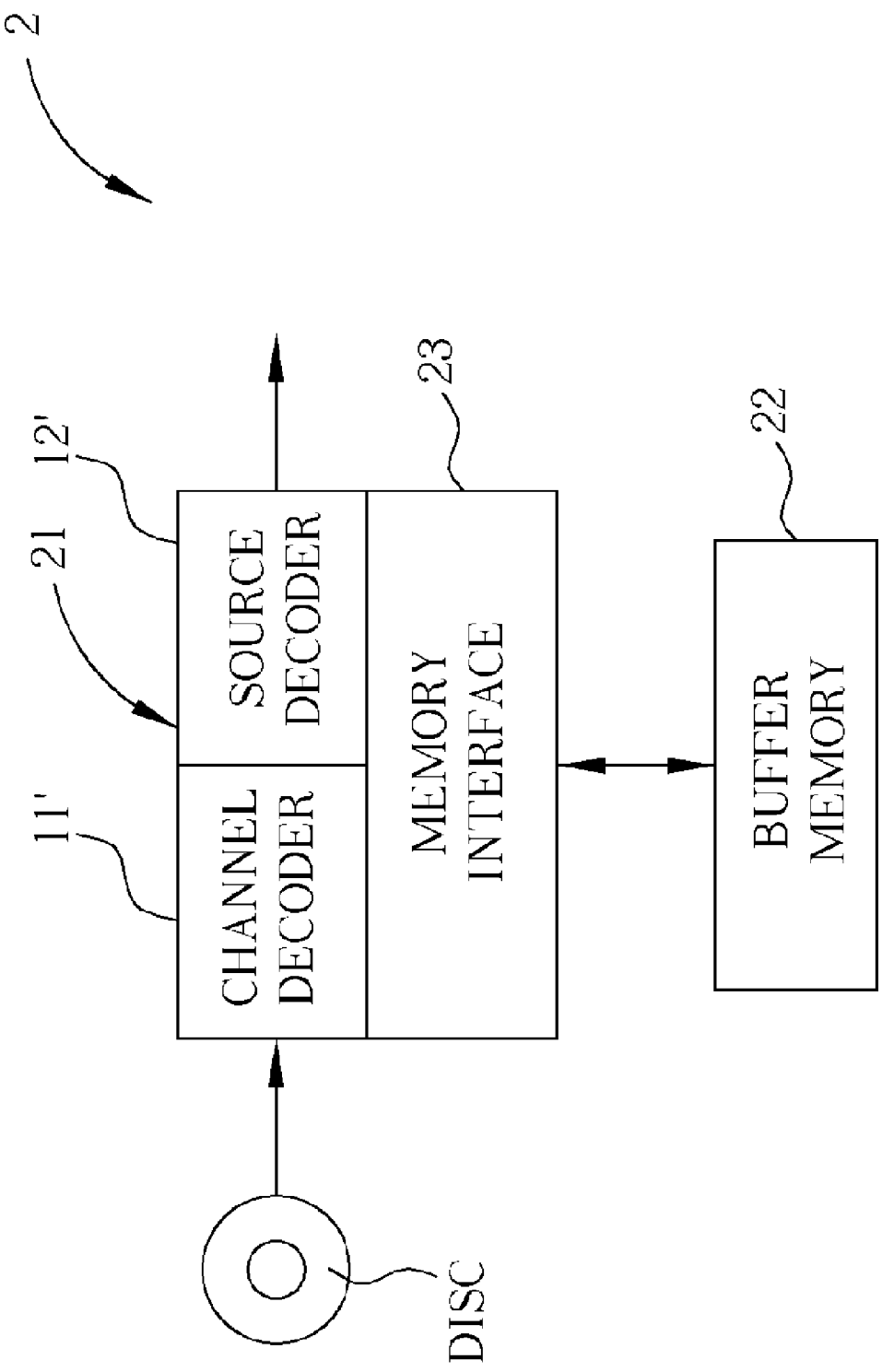
FIG. 2 is a schematic circuit block diagram of another conventional DVD player system.
Figure 3:
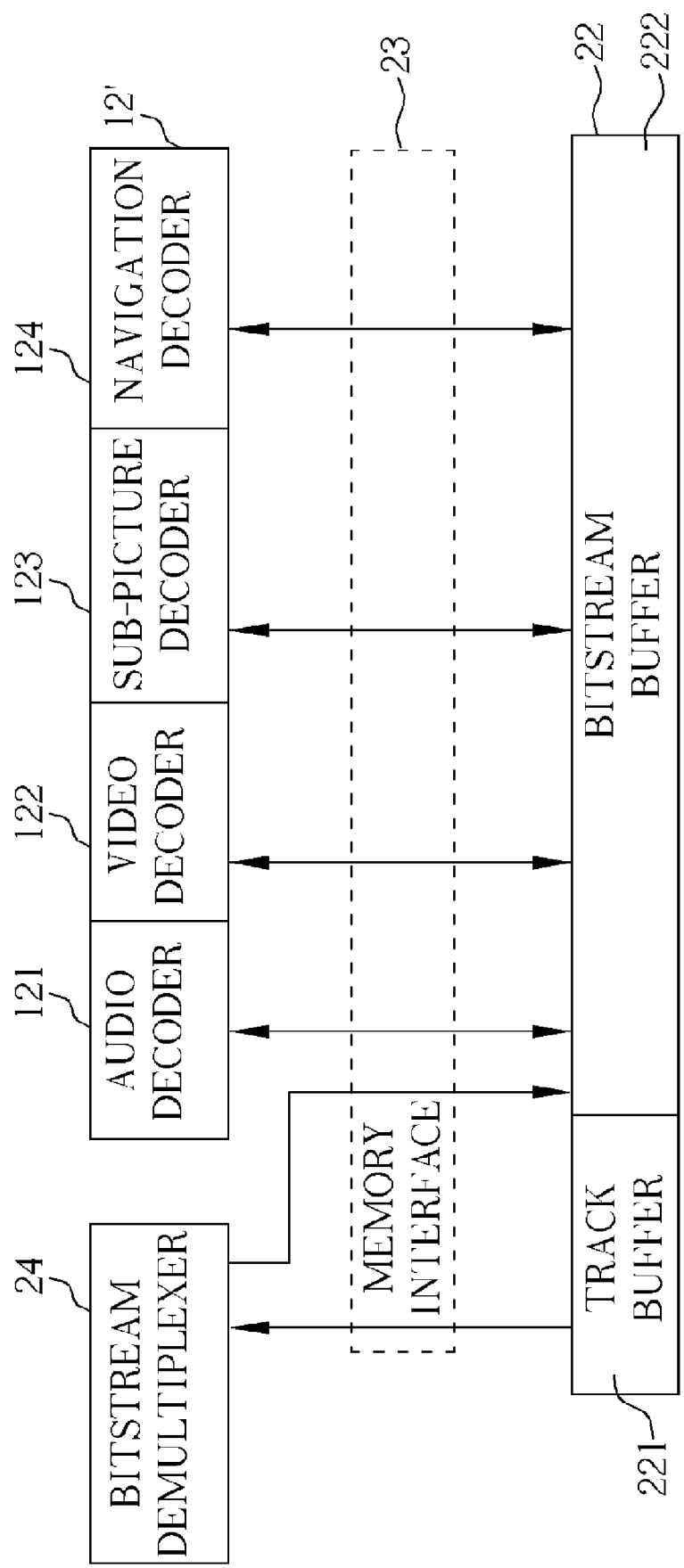
FIG. 3 is a schematic circuit block diagram illustrating a bitstream demultiplexing operation in the conventional DVD player system of FIG. 2.
Figure 4:
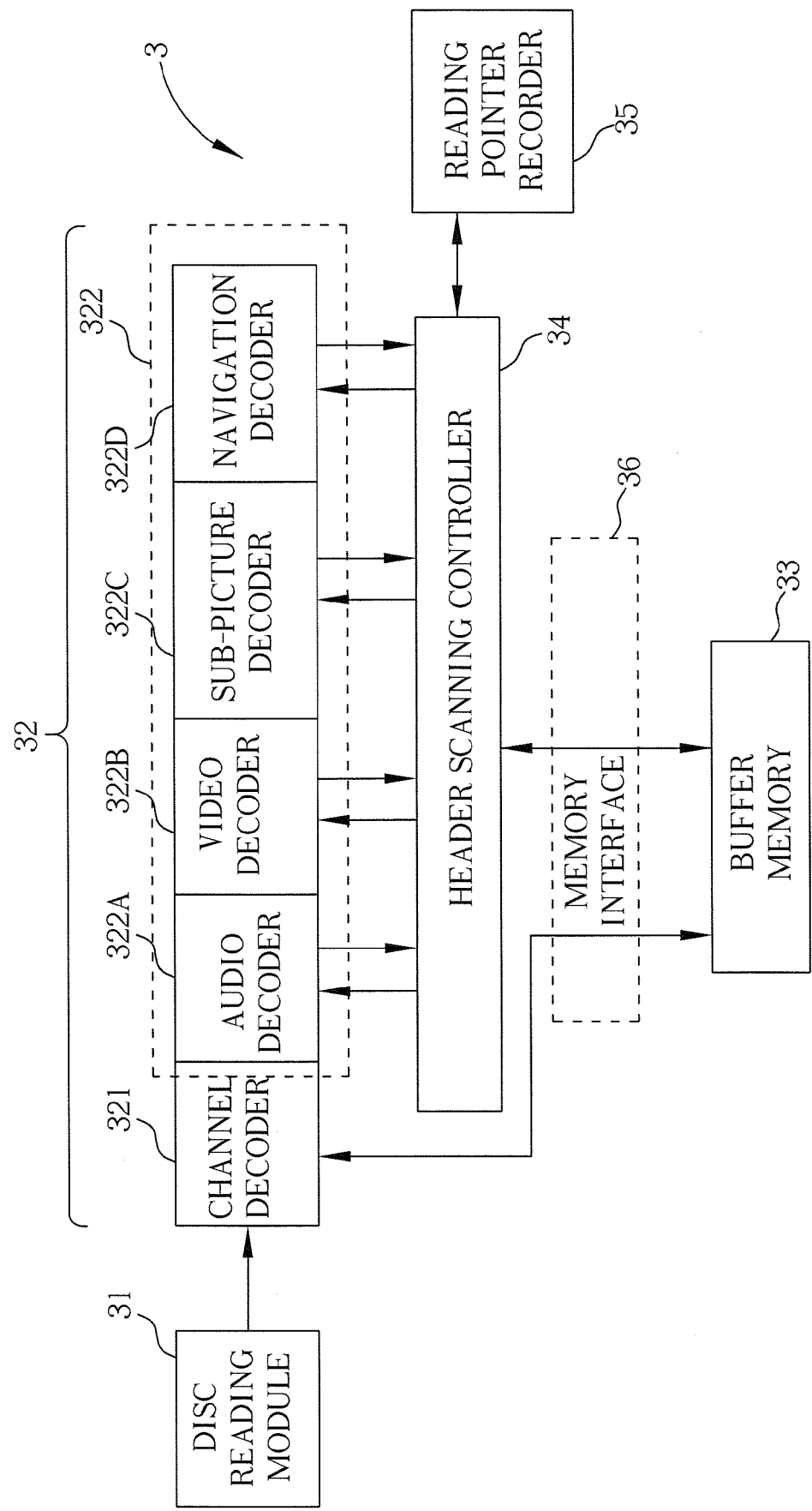
FIG. 4 is a schematic circuit block diagram illustrating the preferred embodiment of an optical disc player system according to the present invention.

Referring to FIG. 4, the preferred embodiment of an optical disc player system 3, such as a DVD player, according to the present invention is shown to include a buffer memory 33, a header scanning controller 34, a decoding unit 32, and a reading pointer recorder 35.

The buffer memory 33, such as a track buffer, stores encoded bitstream data that is read by a disc reading module 31 from an optical disc (not shown) and that is error-corrected by a channel decoder 30. The encoded bitstream data is divided into a plurality of sectors, each of which includes a data portion, and a header portion for indicating a bitstream type of the data portion. The header portion includes a sector ID, a pack header and a packet header.

The header scanning controller 34 is connected to the buffer memory 33 via a memory interface 36.

The decoding unit 32 is connected to the header scanning controller 34, and includes a channel decoder 321 and a set of different data decoders 322 including audio decoder 322A, video decoder 322B, sub-picture decoder 322C, and navigation decoder 322D. Each of the data decoder is used to decode data with a specific bitstream type. Each of the data decoders 322A, 322B, 322C, 322D is capable of sending a bitstream request for reading encoded bitstream data stored in the buffer memory 33 via the header scanning controller 34. In this embodiment, the decoding unit 32 includes an audio decoder 322A for decoding audio data, a video decoder 322B for decoding video data, a sub-picture decoder 322C, and a navigation decoder 322D.

The reading pointer recorder 35 is connected to the header scanning controller 34 and stores four reading pointers associated with the data decoders 322A, 322B, 322C, and 322D. The four reading pointers are audio reading pointer, video reading pointer, sub-picture reading pointer, and navigation reading pointer respectively.

The header scanning controller 34 reads one of the sectors stored in the buffer memory 33 according to the reading pointer from the reading pointer recorder 35 that is associated with one of the decoders 322A, 322B, 322C, 322D that sent out the bitstream request when the header scanning controller 34 receives the bitstream request from said one of the data decoders 322A, 322B, 322C, 322D.

The header scanning controller 34 transfers the data portion of said one of the sectors that is being read from the buffer memory 33 to the data decoder (322A, 322B, 322C, or 322D) that sent out the bitstream request when the header portion of said one of the sectors that is being read from the buffer memory 33 indicates a bitstream type corresponding to that of the bitstream request, and the header scanning controller 34 also enables the reading pointer recorder 35 to adjust the reading pointer to point to a next one of the sectors stored in the buffer memory 33 after reading of said one of the sectors has been completed.

Furthermore, the header scanning controller 34 enables the reading pointer recorder 35 to adjust the reading pointer associated with said one of the decoders 322A, 322B, 322C, 322D that sent out the bitstream request to point to a next one of the sectors stored in the buffer memory 33, and reads the header portion of the next one of the sectors when the bitstream type indicated by the header portion of said one of the sectors being read from the buffer memory 33 does not correspond to that of the bitstream request.

For example, when the video decoder 322B sends out a bitstream request for video data, the header scanning controller 34 receives the bitstream request, reads the sector which is a video bitstream type (a video sector) according to the video reading pointer of the reading pointer recorder 35. After the current video sector has been read from the buffer memory 33, the header scanning controller 34 enables the reading pointer recorder 35 to move the video reading pointer to a next video sector in the buffer memory 33. The similar procedure also applies to the audio decoder 322A, the sub-picture decoder 322C, and the navigation decoder 322D.

It is noted that each of the sectors stored in the buffer memory 33 is defined by the header scanning controller 34 to be in a used state when the data portion thereof has been completely read, and to be in an unused state when otherwise. The header scanning controller 34 enables the reading pointer recorder 35 to adjust the four reading pointers to point the next audio sector, next video sector, next sub-picture sector, or next navigation sector in the buffer memory 33 that is in the unused state when the bitstream type indicated by the header portion of said one of the sectors being read from the buffer memory 33 does not correspond to that of the current bitstream request.

Figure 5:
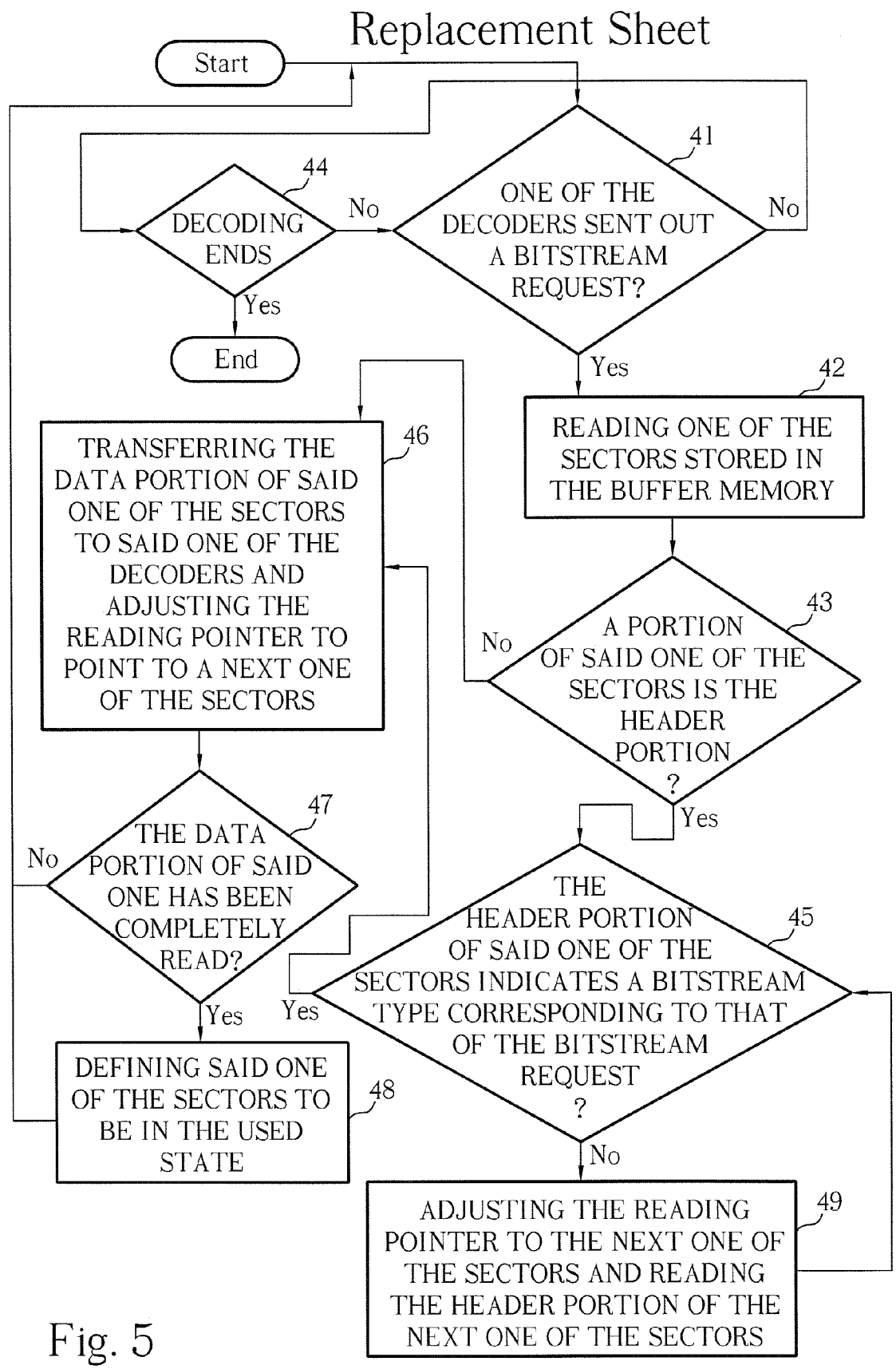
FIG. 5 is a flow chart illustrating a method of controlling a decoding unit in the preferred embodiment to read encoded bitstream data from a buffer memory.

Referring to FIG. 5, there is shown a flow chart to illustrate how the header scanning controller 34 controls the decoding unit 32 in the optical disc player system 3 of the preferred embodiment to read the bitstream data from the buffer memory 33. In step 41, the header scanning controller 34 determines whether one of the decoders 322A, 322B, 322C, 322D sends out the bitstream request. For example, the header scanning controller 34 detects that the audio decoder 321 sends out the bitstream request for decoding audio data. In step 42, the header scanning controller 34 reads one of the sectors stored in the buffer memory 33 according to a reading pointer that is associated with said one of the decoders 322A, 322B, 322C, 322D that sends out the bitstream request (for example, the audio decoder 322A). In step 43, the header scanning controller 34 determines whether a portion of said one of the sectors being read from the buffer memory 33 is the header portion. In step 45, when the portion of said one of the sectors is the header portion, the header scanning controller 34 determines whether the header portion of said one of the sectors that is being read from the buffer memory 33 indicates a bitstream type corresponding to that of the bitstream request. In step 46, the header scanning controller 34 transfers the data portion of said one of the sectors that is being read from the buffer memory 33 to said one of the decoders 322A, 322B, 322C, 322D that sends out the bitstream request (for example, the audio decoder 322A) upon determining in step 45 that the bitstream type indicated by the header portion of said one of the sectors corresponds to that of the bitstream request, and enables the reading pointer recorder 35 to adjust the reading pointer to point to a next one of the sectors stored in the buffer memory 33 after reading of said one of the sectors has been completed. It is noted that, in this case, the reading pointer recorder 35 adjusts the reading pointer to point to the next one of the sectors stored in the buffer memory 33 that is in the unused state. Furthermore, when it is determined in step 43 that the portion of said one of the sectors being read from the buffer memory 33 is not the header portion, the flow proceeds to step 46. In step 47, the header scanning controller 34 determines whether the data portion of said one of the sectors that is being read from the buffer memory 33 has been read completely. When the data portion of said one of the sectors that is being read from the buffer memory 33 has yet to be read completely, the flow proceeds back to step 41. In step 48, the header scanning controller 34 defines said one of the sectors to be in the used state when the data portion of said one of the sectors that is being read from the buffer memory 33 has been read completely, and the flow proceeds back to step 41. In step 49, the header scanning controller 34 enables the reading pointer recorder 35 to adjust the reading pointer associated with said one of the decoders 322A, 322B, 322C, 322D (for example, the audio decoder 322A) that sends out the bitstream request to point to the next one of the sectors stored in the buffer memory 33, and reads the header portion of the next one of the sectors when the bitstream type indicated by the header portion of said one of the sectors being read from the buffer memory 13 is determined in step 45 as not corresponding to that of the bitstream request. The flow then proceeds back to step 45. It is noted that, in this case, the reading pointer recorder 35 adjusts the reading pointer to point to the next one of the sectors stored in the buffer memory 33 that is in the unused state. In step 44, when none of the decoders 321, 322, 323, 324 sent out a bitstream request, the header scanning controller 34 determines whether decoding of the decoding unit 32 ends. If no, the flow proceeds back to step 41.

Accordingly, in the optical disc player system 3 of the present invention, the header scanning controller 34 can control the decoding unit 32 to read encoded bitstream data from the buffer memory 33 through the memory interface 36 such that the buffer memory 33 has a relatively low memory bandwidth requirement, thereby resulting in relatively low costs and power consumption. An object of the invention is thus met.

Figure 6:
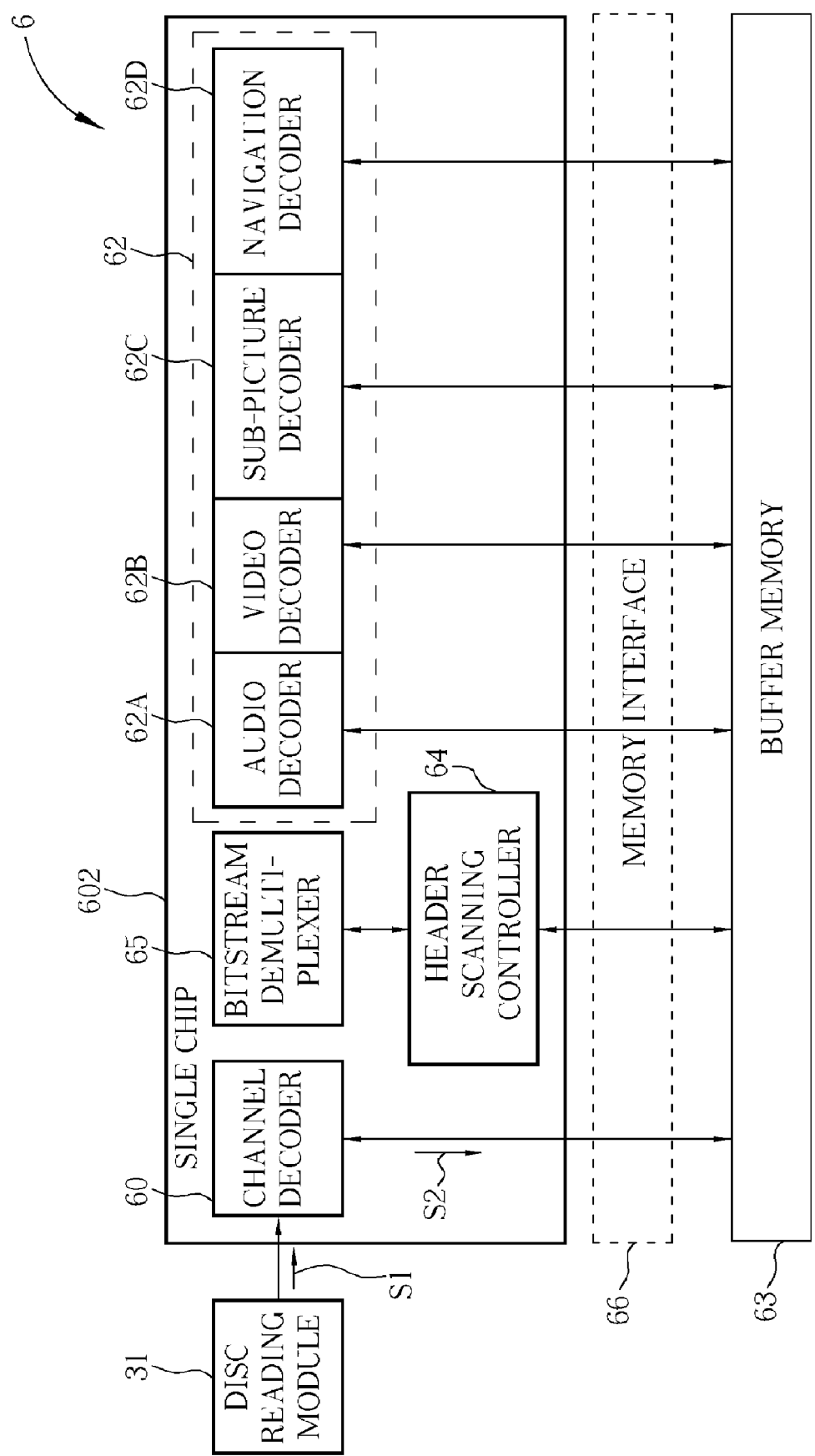
FIG. 6 is a schematic circuit block diagram of an optical disc player system according to another embodiment of the present invention.

FIG. 6 is a schematic circuit block diagram of an optical disc player system 6 according to another embodiment of the present invention. The optical disc player system 6 includes the disc reading module 31 mentioned above. The optical disc player system 6 further includes a channel decoder 60 for generating encoded bitstream data S2 according to an optical disc readout signal SI generated by the disc reading module 31. In this embodiment, the channel decoder 60 is a composite module 60 including the following components (not shown): a DVD/CD digital signal processor (DSP) for decoding the optical disc readout signal S1; a DVD/CD servo controller for performing servo control while the optical disc player system 4 accessing the optical disc; and a DVD/CD error correction code (ECC) decoder for performing ECC correction to generate the encoded bitstream data S2.

As shown in FIG. 6, the optical disc player system 6 further includes a buffer memory 63 for storing the encoded bitstream data S2. The encoded bitstream data is divided into a plurality of sectors, each of which includes a data portion, and a header portion for indicating a bitstream type of the data portion. Wherein, the header portion includes a sector ID, a pack header and a packet header. The optical disc player system 6 further includes: a memory interface 66; a header scanning controller 64 coupled to the buffer memory 63 via the memory interface 66 for scanning the header portion and accessing the encoded bitstream data stored in the buffer memory 63; and a bitstream demultiplexer 65 coupled to the header scanning controller 64 for rearranging the encoded bitstream data stored in the buffer memory 63 according to the bitstream type for continuously storing sectors corresponding to the same bitstream type in the same region within the buffer memory 63.

Please note, the header scanning controller 64 of this embodiment is a simplified variation of the header scanning controller 34 shown in FIG. 4 since the header scanning controller 64 does not need an additional component such as the reading pointer recorder 35 shown in FIG. 4 while the bitstream demultiplexer 65 is rearranging the encoded bitstream data stored in the buffer memory 63. As the header scanning controller 64 is capable of scanning the header portion to determine the bitstream type of the corresponding data portion, the bitstream demultiplexer 65 does not need to read a data portion of an unwanted bitstream type. The bitstream demultiplexer 65 simply reads data of a specific bitstream type and continuously store the data of the specific bitstream type in a specific region within the buffer memory 63. As a result, the memory bandwidth between the bitstream demultiplexer 65 and the buffer memory 63 is saved.

The optical disc player system 6 further includes a decoding unit 62 coupled to the buffer memory 63. In this embodiment, the decoding unit 62 is a MPEG decoding unit 62 including an audio decoder 62A for decoding audio data, a video decoder 62B for decoding video data, a sub-picture decoder 62C, and a navigation decoder 62D. Each of the decoders 62A, 62B, 62C, and 62D is used to decode data with a specific bitstream type and is capable of reading encoded bitstream data stored in the buffer memory 63 by direct memory access (DMA). Please note, the channel decoder 60, the decoding unit 62, the bitstream demultiplexer 65, and the header scanning controller 64 are integrated into a single chip 602.

Figure 7:
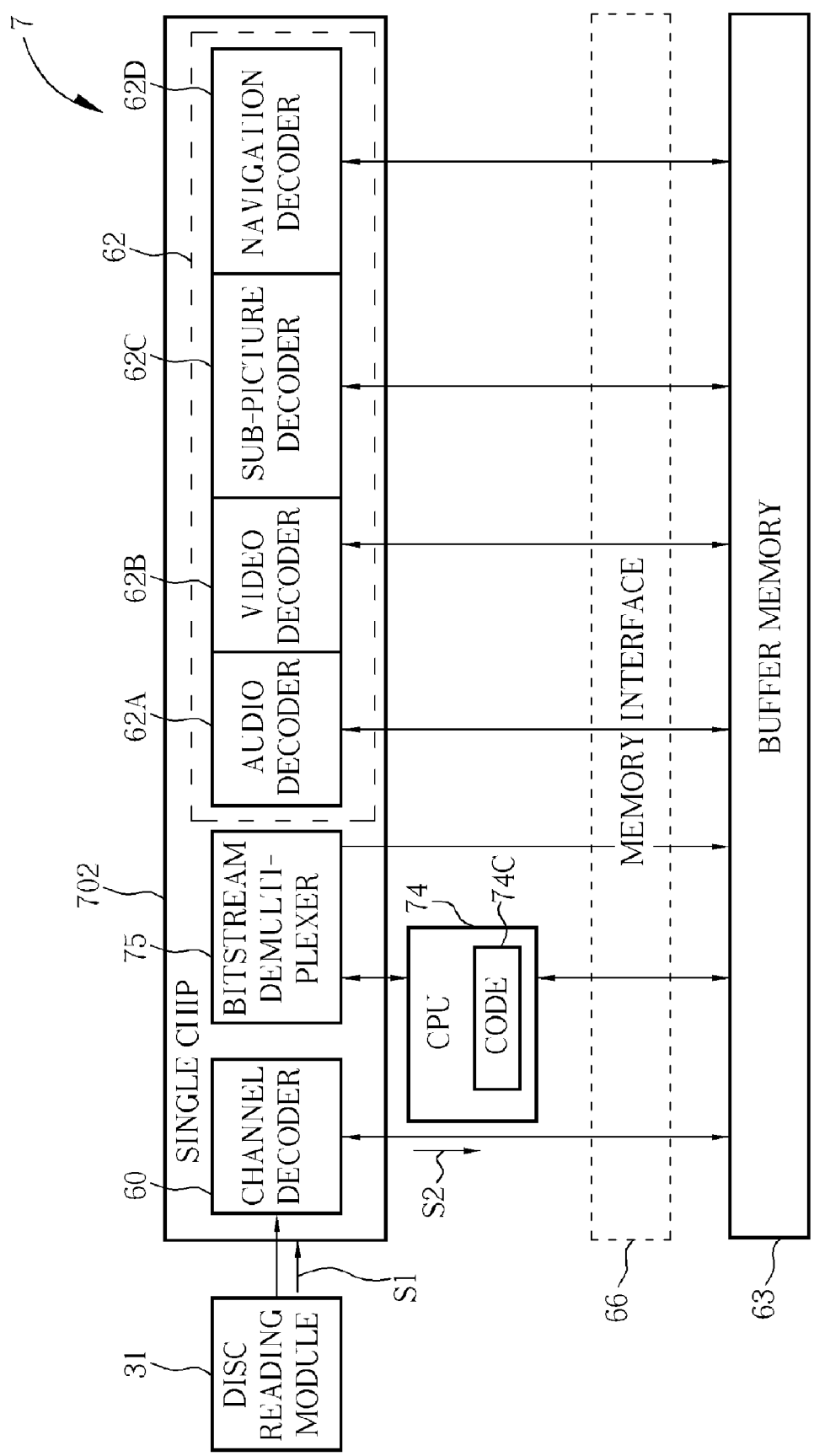
FIG. 7 is a schematic circuit block diagram of an optical disc player system according to another embodiment of the present invention.

FIG. 7 is a schematic circuit block diagram of an optical disc player system 7 according to another embodiment of the present invention. The embodiment shown in FIG. 7 is similar to the embodiment shown in FIG. 6 with exceptions described as follows. As shown in FIG. 7, the header scanning controller 74 of this embodiment is a Central Processing Unit (CPU) 74 executing a specific program code 74c, and the channel decoder 60, the decoding unit 62, and the bitstream demultiplexer 75 are integrated into a single chip 702.

While the present invention has been described in connection with what is considered the most practical and preferred embodiment, it is understood that this invention is not limited to the disclosed embodiments but is intended to cover various arrangements included within the spirit and scope of the broadest interpretation so as to encompass all such modifications and equivalent arrangements.

What is claimed is:

1. A method of controlling a decoding unit in an optical disc player system to read encoded bitstream data from a buffer memory, the encoded bitstream data being divided into a plurality of sectors, each of which includes a data portion, and a header portion for indicating a bitstream type of the data portion, the decoding unit including a set of different decoders, each of which is used to decode data with a specific bitstream type, said method comprising the steps of:
   (a) determining whether one of the decoders sent out a bitstream request;
   (b) reading one of the sectors stored in the buffer memory according to a reading pointer that is associated with said one of the decoders that sent out the bitstream request;
   (c) determining whether a portion of said one of the sectors being read from the buffer memory is the header portion;
   (d) determining whether the header portion of said one of the sectors that is being read from the buffer memory indicates a bitstream type corresponding to that of the bitstream request upon determining that the portion of said one of the sectors is the header portion; and
   (e) transferring the data portion of said one of the sectors that is being read from the buffer memory to said one of the decoders that sent out the bitstream request upon determining that the bitstream type indicated by the header portion of said one of the sectors corresponds to that of the bitstream request, and adjusting the reading pointer to point to a next one of the sectors stored in the buffer memory after reading of said one of the sectors has been completed;
   wherein steps (b), (c), (d) and (e) are executed after step (a) determines that the bitstream request is sent.

2. The method as claimed in claim 1, wherein the decoders include at least one of a video decoder for decoding video data, an audio decoder for decoding audio data, a sub-picture decoder, and a navigation decoder.

3. The method as claimed in claim 1, wherein the header portion includes a sector ID, a pack header and a packet header.

4. The method as claimed in claim 1, further comprising the step of:
   (f) upon determining that the bitstream type indicated by the header portion of said one of the sectors being read from the buffer memory does not correspond to that of the bitstream request, adjusting the reading pointer to point to the next one of the sectors stored in the buffer memory, reading the header portion of the next one of the sectors, and proceeding back to step (d).

5. The method as claimed in claim 4, wherein each of the sectors stored in the buffer memory is defined to be in a used state when the data portion thereof has been completely read, and is defined to be in an unused state when otherwise.

6. The method as claimed in claim 5, wherein, in step (f), the reading pointer is adjusted to point to the next one of the sectors stored in the buffer memory that is in the unused state.

7. The method as claimed in claim 1, wherein said decoders correspond to different bitstream types, respectively; and the method further comprises setting a plurality of reading pointers associated with said decoders, respectively.

8. An optical disc player system, comprising:
   a buffer memory for storing encoded bitstream data, the encoded bitstream data being divided into a plurality of sectors, each of which includes a data portion, and a header portion for indicating a bitstream type of the data portion;
   a header scanning controller connected to said buffer memory;
   a decoding unit connected to said header scanning controller, said decoding unit including a set of different decoders, each of which is used to decode data with a specific bitstream type, each of said decoders being capable of sending a bitstream request for reading encoded bitstream data stored in said buffer memory to said header scanning controller; and
   a reading pointer recorder connected to said header scanning controller;
   after said header scanning controller receives a bitstream request from one of said decoders:
   said header scanning controller reading one of the sectors stored in said buffer p memory according to a reading pointer stored in said reading pointer recorder that is associated with said one of said decoders that sent out the bitstream request; and
   said header scanning controller transferring the data portion of said one of the sectors that is being read from said buffer memory to said one of the decoders that sent out the bitstream request when the header portion of said one of the sectors that is being read from said buffer memory indicates a bitstream type corresponding to that of the bitstream request, and enabling said reading pointer recorder to adjust the reading pointer to point to a next one of the sectors stored in said buffer memory after reading of said one of the sectors has been completed.

9. The optical disc player system as claimed in claim 8, wherein said decoders include at least one of a video decoder for decoding video data, an audio decoder for decoding audio data, a sub-picture decoder, and a navigation decoder.

10. The optical disc player system as claimed in claim 8, wherein the header portion includes a sector ID, a pack header and a packet header.

11. The optical disc player system as claimed in claim 8, wherein said header scanning controller enables said reading pointer recorder to adjust the reading pointer associated with said one of said decoders that sent out the bitstream request to point to a next one of the sectors stored in said buffer memory, and reads the header portion of the next one of the sectors when the bitstream type indicated by the header portion of said one of the sectors being read from said buffer memory does not correspond to that of the bitstream request.

12. The optical disc player system as claimed in claim 11, wherein each of the sectors stored in said buffer memory is defined by said header scanning controller to be in a used state when the data portion thereof has been completely read, and to be in an unused state when otherwise.

13. The optical disc player system as claimed in claim 12, wherein said header scanning controller enables said reading pointer recorder to adjust the reading pointer to point to the next one of the sectors stored in said buffer memory that is in the unused state when the bitstream type indicated by the header portion of said one of the sectors being read from said buffer memory does not correspond to that of the bitstream request.

14. The optical disc player system as claimed in claim 8, wherein said decoders correspond to different bitstream types, respectively; and said reading pointer recorder stores a plurality of reading pointers associated with said decoders, respectively.

15. An optical disc player system, comprising:
a buffer memory for storing encoded bitstream data, the encoded bitstream data being divided into a plurality of sectors, each of which includes a data portion, and a header portion for indicating a bitstream type of the data portion;
a header scanning controller for scanning header portions of the sectors stored in the buffer memory and accessing the encoded bitstream data stored in the buffer memory, wherein the header scanning controller selects a plurality of specific sectors corresponding to an identical specific bitstream type from the encoded bitstream data stored in the buffer memory, receives the specific sectors from the buffer memory, and continuously outputs the specific sectors to the bitstream demultiplexer;
a bitstream demultiplexer coupled to the header scanning controller for rearranging the encoded bitstream data according to the bitstream type for continuously storing sectors corresponding to the same bitstream type in the same region within the buffer memory, wherein the header scanning controller is coupled between the buffer memory and the bitstream demultiplexer, and the sectors corresponding to the same bitstream type are received from the header scanning controller; and
a decoding unit coupled to the buffer memory, the decoding unit including a set of different decoders, each of the decoders being used to decode data with a specific bitstream type and being capable of reading the encoded bitstream data stored in the buffer memory.

16. The optical disc player system as claimed in claim 15, wherein the decoders include at least one of a video decoder for decoding video data, an audio decoder for decoding audio data, a sub-picture decoder, and a navigation decoder.

17. The optical disc player system as claimed in claim 15, wherein the header portion includes a sector ID, a pack header and a packet header.

18. The optical disc player system as claimed in claim 15, wherein the header scanning controller is a CPU executing a specific program code.

19. The optical disc player system as claimed in claim 15 further comprising:
a channel decoder for generating the encoded bitstream data according to an optical disc readout signal.

20. The optical disc player system as claimed in claim 19, wherein the channel decoder, the decoding unit, the bitstream demultiplexer, and the header scanning controller are integrated into a single chip.

21. The optical disc player system as claimed in claim 19, wherein the channel decoder, the decoding unit, and the bitstream demultiplexer are integrated into a single chip.

22. The optical disc player system as claimed in claim 15, wherein the header scanning controller prevents the bitstream demultiplexer from reading a sector of an unwanted bitstream type when the bitstream demultiplexer continuously stores the sectors corresponding to the same bitstream type in the same region within the buffer memory.

* * * * *